US009238236B2

(12) United States Patent
Zhou et al.

(10) Patent No.: US 9,238,236 B2
(45) Date of Patent: Jan. 19, 2016

(54) WATERWAY SWITCH VALVE SET AND A SHOWER HEAD USING SAME

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Huasong Zhou, Xiamen (CN); Hui Huang, Xiamen (CN); Jianmin Chen, Xiamen (CN); Yulin Wu, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 0 days.

(21) Appl. No.: 14/362,454

(22) PCT Filed: Nov. 27, 2012

(86) PCT No.: PCT/CN2012/085326
§ 371 (c)(1),
(2) Date: Jun. 3, 2014

(87) PCT Pub. No.: WO2013/083009
PCT Pub. Date: Jun. 13, 2013

(65) Prior Publication Data
US 2014/0353407 A1 Dec. 4, 2014

(30) Foreign Application Priority Data

Dec. 5, 2011 (CN) .......................... 2011 1 0398114
Dec. 5, 2011 (CN) ...................... 2011 2 0501757 U

(51) Int. Cl.
*B05B 1/18* (2006.01)
*B05B 1/16* (2006.01)
*F16K 11/074* (2006.01)

(52) U.S. Cl.
CPC ............... *B05B 1/185* (2013.01); *B05B 1/1609* (2013.01); *B05B 1/18* (2013.01); *F16K 11/074* (2013.01)

(58) Field of Classification Search
CPC ........ B05B 1/185; B05B 1/1609; B05B 1/18; F16K 11/074; F16K 11/065; F16K 11/0565; F16K 5/12
USPC ..................................................... 137/625.17
See application file for complete search history.

(56) References Cited

U.S. PATENT DOCUMENTS

| 5,647,537 A * | 7/1997 | Bergmann ................ B05B 1/16 239/383 |
| 2002/0109023 A1* | 8/2002 | Thomas ................ B05B 1/1663 239/562 |

(Continued)

FOREIGN PATENT DOCUMENTS

| CN | 201140131 Y | 10/2008 |
| CN | 201692892 U | 1/2011 |

(Continued)

Primary Examiner — Craig Schneider
Assistant Examiner — Kevin Barss
(74) Attorney, Agent, or Firm — Rabin & Berdo, P.C.

(57) ABSTRACT

A waterway switch valve set and a shower head using same includes a fixed unit with an inlet waterway and a rotation unit rotatably connected to the fixed unit. The rotation has a water diversion base and a sealing component unit and can rotate about a rotation axis. The water diversion base is has a cooperated surface vertical to the rotation axis, the cooperated surface is disposed with a plurality of diversion water holes annularly arranged about the rotation axis, the diversion water holes are available to connect to the inlet waterway; the sealing component has a rotation frame and a plurality of press blocks, the rotation frame and the water diversion base are assembled together, and form a synchronous rotation relationship, the press blocks are slidably connected to the rotation frame and are available to slide parallel to the rotation axis.

11 Claims, 7 Drawing Sheets

(56) References Cited

U.S. PATENT DOCUMENTS

| | | | |
|---|---|---|---|
| 2006/0266852 A1* | 11/2006 | Choi | B05B 1/185 239/548 |
| 2008/0023577 A1* | 1/2008 | Zhen | B05B 1/1618 239/449 |
| 2008/0156902 A1* | 7/2008 | Luettgen | B05B 1/1636 239/447 |
| 2009/0289129 A1* | 11/2009 | Qiu | B05B 1/1618 239/550 |
| 2011/0192915 A1* | 8/2011 | Li | B05B 1/18 239/394 |

FOREIGN PATENT DOCUMENTS

| | | |
|---|---|---|
| CN | 102466061 A | 5/2012 |
| CN | 202402704 U | 8/2012 |
| DE | 102006020765 A1 | 11/2007 |
| JP | H084068 A | 1/1996 |
| JP | 2001323528 A | 11/2001 |

* cited by examiner

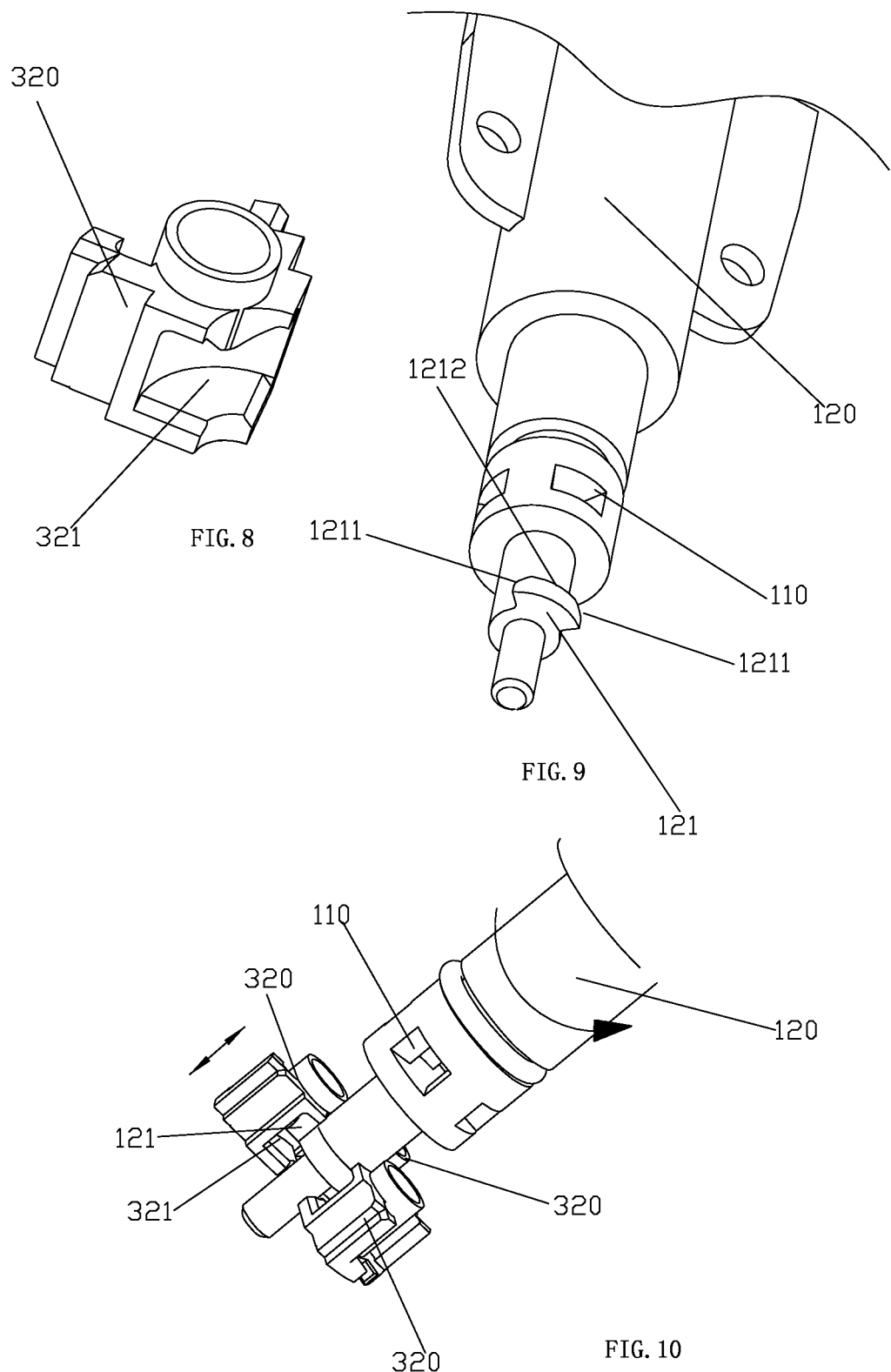

WATERWAY SWITCH VALVE SET AND A SHOWER HEAD USING SAME

FIELD OF THE INVENTION

The present invention relates to a waterway switch valve set and a shower head using same.

BACKGROUND OF THE INVENTION

Existing waterway switch valves have rotation switch type and sliding switch type. The rotation switch type valves have a valve body, a switch unit and a rotation sleeve, the switch unit is rotatably disposed inside the valve body, the rotation sleeve and the switch unit are assembled together, the user rotates the rotation sleeve to drive the switch unit to rotate with respect to the valve body so as to switch the valve. The sliding switch type valves have a valve body, a switch unit and a sliding sleeve, the switch unit is slidably disposed inside the valve body, the sliding sleeve and the switch unit are assembled together, the user makes the sliding sleeve sliding to drive the switch unit to slide with respect to the valve body so as to switch the valve. whether rotation switch type or sliding switch type, there is always friction between the switch unit and the valve body during switching, the sealing component of the switch unit becomes worn so quickly, besides the user has to use force hard in the switch unit.

SUMMARY OF THE INVENTION

The present invention is provided with a waterway switch valve set and a shower head using same.

A first technical proposal of the present invention to solve the technical problem is:

A waterway switch valve set comprising:

a fixed unit (100) with an inlet waterway (110); and a rotation unit rotatably connected to the fixed unit (100), the rotation unit can rotate about a rotation axis (X), the rotation unit comprising:

a water diversion base (200) with a cooperated surface (210) vertical to the rotation axis (X), the cooperated surface (210) is disposed with a plurality of diversion water holes (220) annularly arranged about the rotation axis (X), the diversion water holes (220) are available to connect to the inlet waterway (110); and a sealing component (300) with a rotation frame (310) and a plurality of press blocks (320), the rotation frame (310) and the water diversion base (200) are assembled together, and form a synchronous rotation relationship, the press blocks (320) are slidably connected to the rotation frame (310) and are available to slide parallel to the rotation axis (X), the press blocks (320) and the diversion water holes (220) are corresponding one by one and the press blocks (320) slide to control the close and open of the diversion water holes (220); the fixed unit (100), the rotation frame (310) and the press blocks (320) cooperate to make that the rotation frame (310), when rotating, drives the press blocks (320) to slide alternately.

In another preferred embodiment, the water diversion base (200) and the fixed unit (100) cooperate and form a cavity (400) to connect to the inlet waterway (110), the cooperated surface (210) is opposite to the cavity (400), the diversion water holes (220) are available to connect to the cavity (400); the sealing component (300) is disposed inside the cavity (400).

In another preferred embodiment, a restoring elastic piece (330) is disposed between each press block (320) and the rotation frame (310).

In another preferred embodiment, the fixed unit (100) is disposed with a middle shaft (120), the middle shaft (120) is protruded with a projection block (121), the middle shaft (120) inserts into the sealing component (300) and the middle shaft thereof coincides with the rotation axis (X);

the interior of the press block (320) is disposed with a groove (321), the press blocks (320) are arranged about the middle shaft (120), the groove (321) and the press block (121) cooperate;

when the press blocks (320) rotate with respect to the middle shaft (120), the groove (321) corresponding to projection block (121) is pushed by the projection block (121) to drive the press blocks (320) to slide.

In another preferred embodiment, the fixed unit (100) is disposed with a middle shaft (120), the middle shaft (120) is disposed with a cam, the end face of the cam is concave-convex, the middle shaft (120) inserts into the sealing component (300) and the axis thereof coincides with the rotation shaft (X);

In another preferred embodiment, the lower ends of the press blocks (320) abut against the end face of the cam;

when the press blocks (320) rotate with respect to the cam, the concave-convex end face of the cam works on the press blocks (320) to drive the press blocks (320) to slide.

In another preferred embodiment, the middle shaft (120) is disposed with a hollow hole, the hollow hole forms the part or whole of the inlet waterway (110).

In another preferred embodiment, the fixed unit (100) is disposed with a cam with the axis thereof coinciding with the rotation shaft (X), the end face of the cam is concave-convex;

the lower ends of the press blocks (320) abut against the end face of the cam;

when the press blocks rotate with respect to the cam, the concave-convex end face of the cam works on the press blocks (320) to drive the press blocks (320) to slide.

In another preferred embodiment, the fixed unit (100) is disposed with a pivot hole (180) and a first outlet waterway (130), the first outlet waterway is connected to the pivot hole; the water diversion base (200) is disposed with an axis hole (260) along the rotation shaft (X), the axis hole (260) is connected to a diversion water hole (220), the end of the water diversion base (200) is pivot joint to the pivot hole (180), the axis hole (260) is connected to the first outlet waterway.

A second technical proposal of the present invention to solve the technical problem is as below:

A waterway switch valve set comprising:

a fixed unit with an inlet waterway, a plurality of outlet waterways and a cavity connected to the inlet waterway and the outlet waterways therebetween, the inlet ports of the outlet waterways are annularly arranged about an axis;

a plurality of press blocks slidably connected to the fixed unit inside the cavity, the press blocks are available to slide parallel to the axis, the press blocks and the outlet waterways are corresponding one by one, the press blocks slide to control the open and close of the outlet waterways; and a rotation unit rotatably connected to the cavity of the fixed unit, the rotation unit rotates about the axis, the fixed unit, the press blocks and the rotation unit cooperate to make that the rotation unit, when rotating, drives the press blocks to slide alternately.

A third technical proposal of the present invention to solve the technical problem is as below:

A shower head applied with a waterway switch valve set comprising:

a fixed unit (100) with an inlet waterway (110) and at least a first outlet waterway (130); and a rotation unit rotatably connected to the fixed unit (100), the rotation unit can rotate about a rotation axis (X), the rotation unit comprising:

a water diversion base (200) with a cooperated surface (210) vertical to the rotation axis (X) and at least a second outlet waterway (230), the cooperated surface (210) is disposed with a plurality of diversion water holes (220) annularly arranged about the rotation axis (X), the inlet ports of the diversion water holes (220) are available to connect to the inlet waterway (110), the outlet ports of the diversion water holes (220) are respectively connected to the first outlet waterway (130) and the second outlet waterway (230); and a sealing component with a rotation frame (310) and a plurality of press blocks (320), the rotation frame (310) and the water diversion base (200) are assembled together, and form a synchronous rotation relationship, the press blocks (320) are slidably connected to the rotation frame (310) and are available to slide parallel to the rotation axis (X), the press blocks (320) and the diversion water holes (220) are corresponding one by one and the press blocks (320) slide to control the close and open of the diversion water holes (220); the fixed unit (100), the rotation frame (310) and the press blocks (320) cooperate to make that the rotation frame (310), when rotating, drives the press blocks (320) to slide alternately.

Compared to the existing technology, the technical proposal of the present invention has advantages as below:

1. The water diversion base rotates to drive the press blocks to slide alternately, so as to control the close and open of each diversion water holes, so that the diversion water holes are switched, during switching, the press blocks and the water diversion base never have friction, the switch is labor saving, the service life is long and the switch is convenient.
2. The water diversion base is disposed with a top cover, the fixed unit is disposed with a top cover as well, so that the outlet functions become richer, the switch is convenient.
3. The press blocks and the rotation frame are disposed with restoring elastic piece therebetween, thus ensuring the restoring of the press blocks.
4. The press blocks rotate with respect to the middle shaft, the groove corresponding to the projection block is pushed by the projection block to drive the press block to slide, the structure is simple and the compact.
5. When the press block rotates with respect to the cam, the concave-convex end face of the cam works on the press block to make the press block sliding, the structure is simple and compact.

BRIEF DESCRIPTION OF THE DRAWINGS

The present invention will be further described with drawings and embodiments.

FIG. 8 illustrates a schematic diagram of the press block of the first preferred embodiment.

FIG. 9 illustrates a partial schematic diagram of the middle shaft of the first preferred embodiment.

FIG. 10 illustrates a cooperation of the middle shaft and the press block of the first preferred embodiment.

DETAILED DESCRIPTION OF THE EMBODIMENTS

Figure 1:
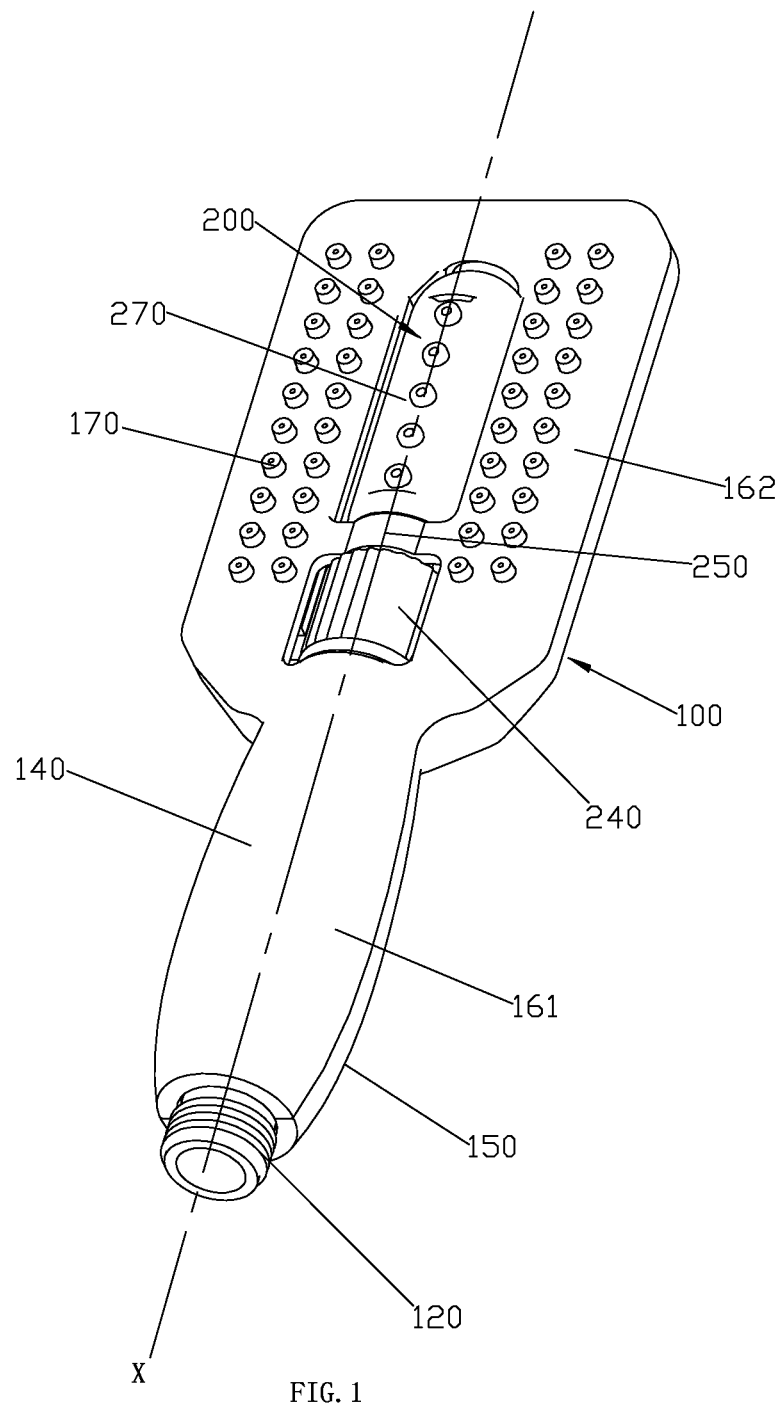
FIG. 1 illustrates a schematic diagram of a shower head of a first preferred embodiment.
Figure 2:
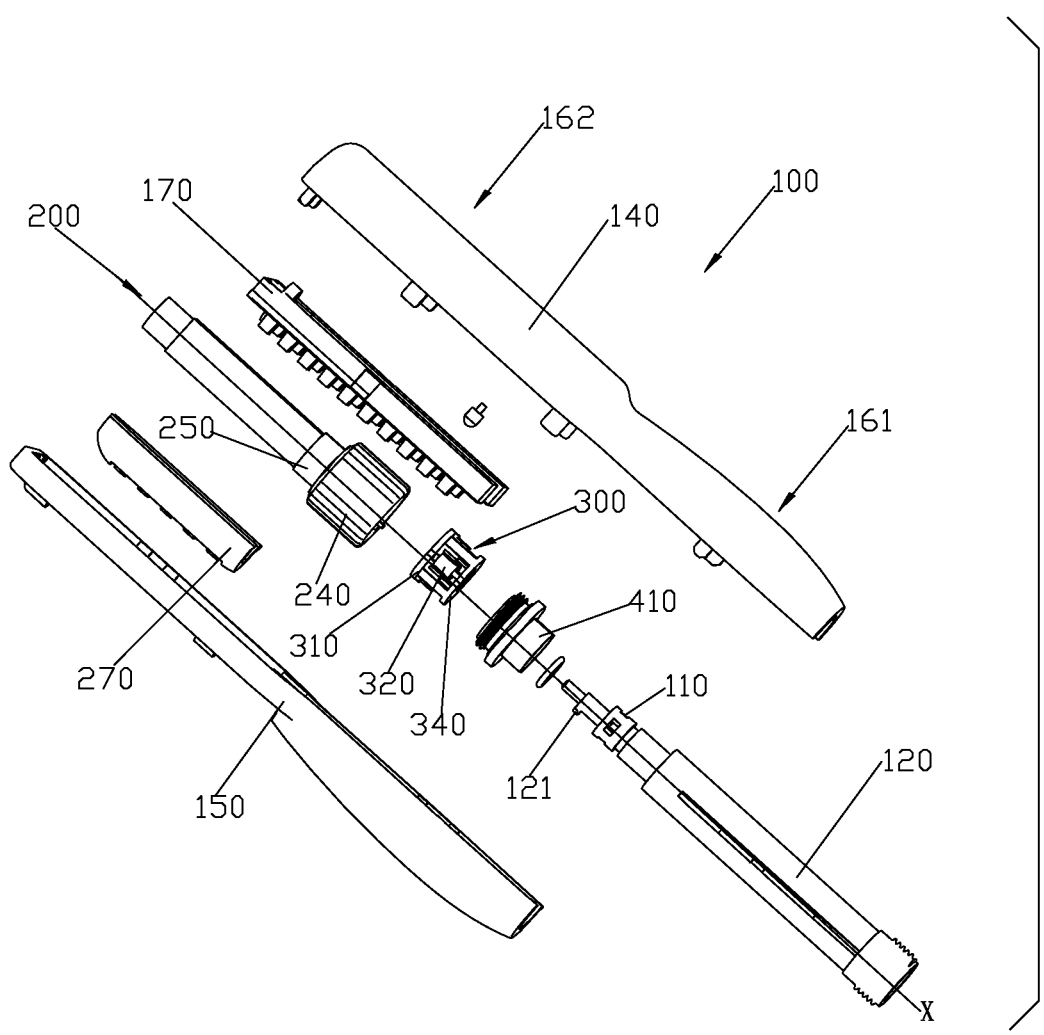
FIG. 2 illustrates an exploded diagram of the shower head of the first preferred embodiment.
Figure 3:
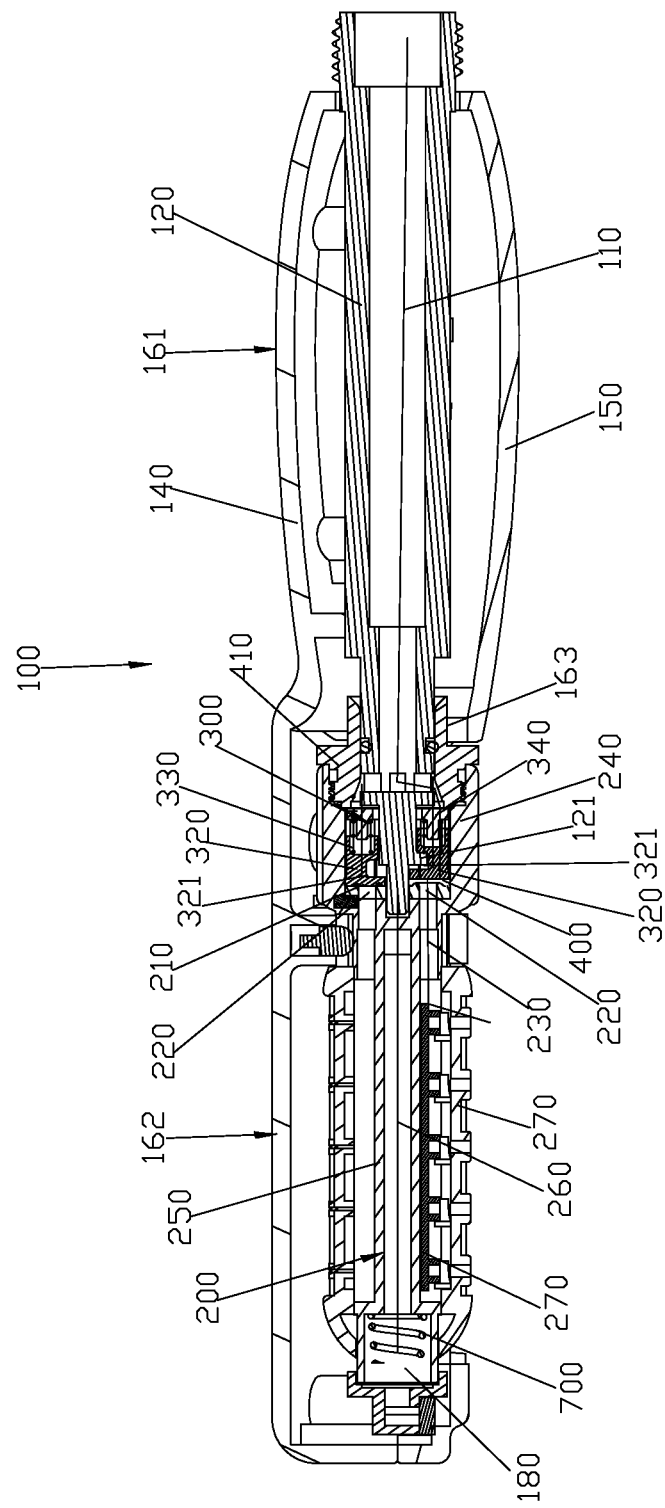
FIG. 3 illustrates a first sectional view of the shower head of the first preferred embodiment when a first outlet function is discharging water.
Figure 4:
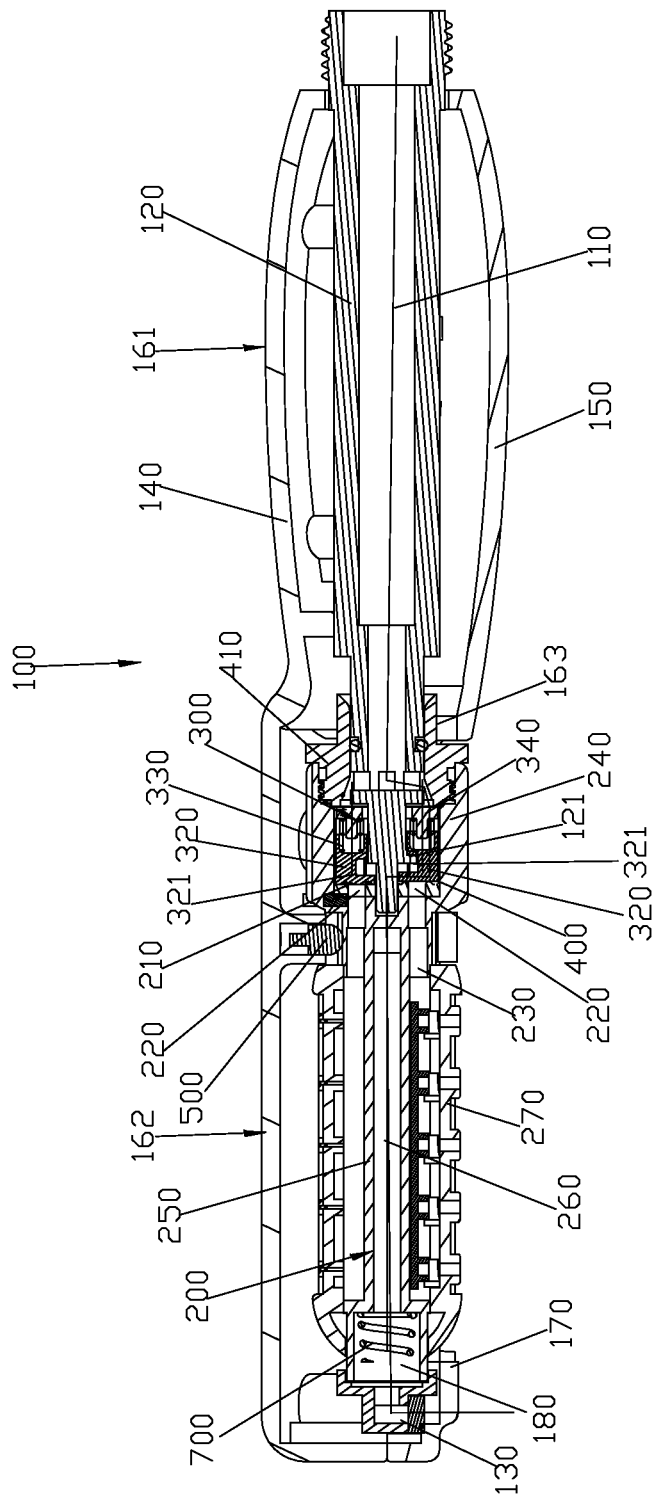
FIG. 4 illustrates a second sectional view of the shower head of the first preferred embodiment when a second outlet function is discharging water.
Figure 5:
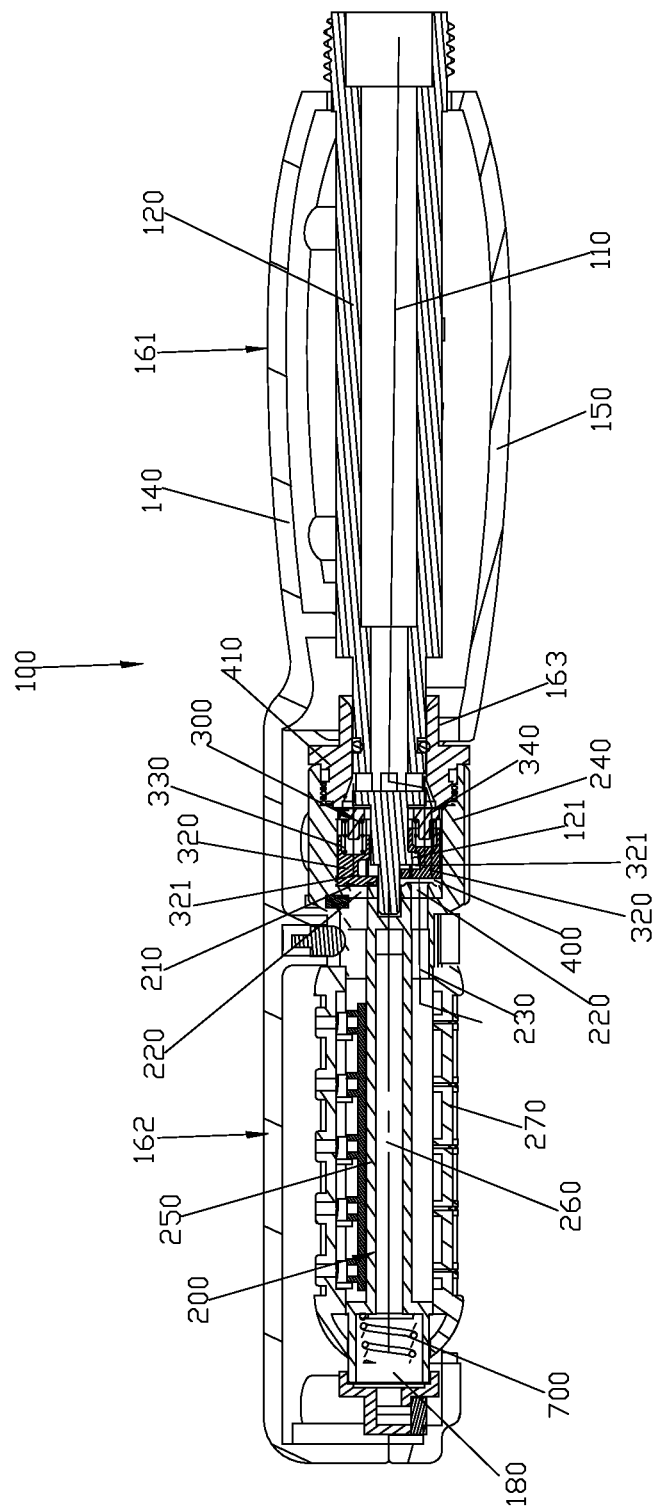
FIG. 5 illustrates a third sectional view of the shower head of the first preferred embodiment when a third outlet function is discharging water.
Figure 6:
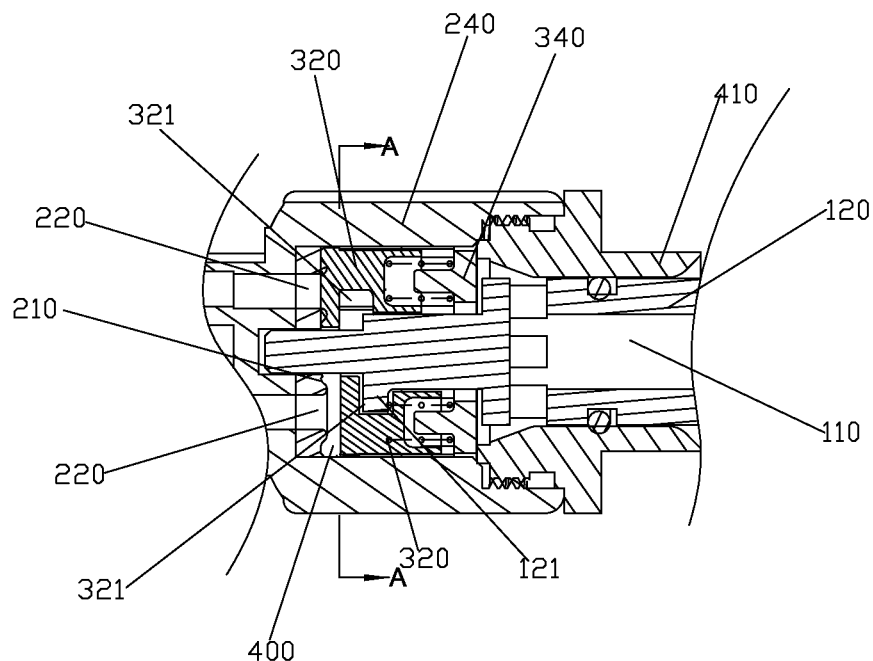
FIG. 6 illustrates a partial enlargement diagram of FIG. 3 of the first preferred embodiment.
Figure 7:
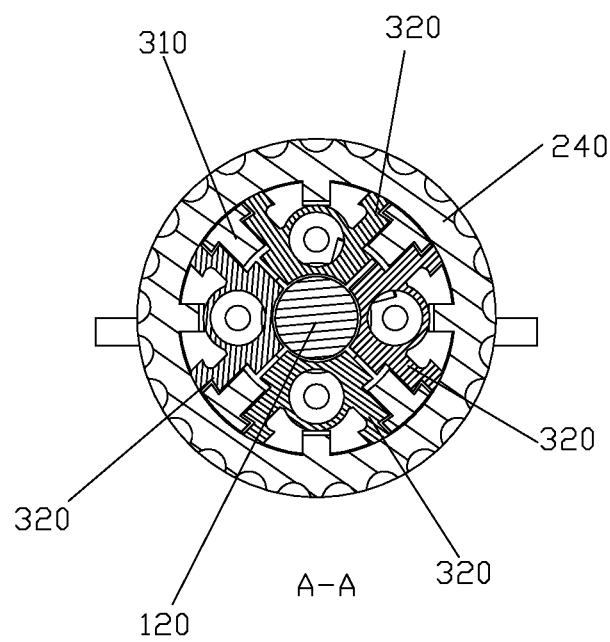
FIG. 7 illustrates a sectional view of A-A section of FIG. 6 of the first preferred embodiment.

The first embodiment, please refer to FIG. 1 to FIG. 10, a shower head applied with a waterway switch valve set comprises a fixed unit 100 and a rotation unit.

The fixed unit 100 is disposed with an inlet waterway 110 and a first outlet waterway 130.

In this embodiment, the fixed unit 100 comprises a main body and a middle shaft 120. the middle shaft 120 is disposed with a hollow hole, an end face at the head of the middle shaft 120 is concaved to form the hollow hole, the middle shaft 120 is further disposed with an radial hole throughout outside and inside, an internal port of the radial hole is connected to the hollow hole near to the bottom surface of the hollow hole, an external port of the radial hole is disposed in the rear end of the middle shaft 120, in this embodiment, the hollow hole is connected to the radial hole so as to form the inlet waterway 110.

In this embodiment, the main body has a handle section 161 and an annular section 162, the middle shaft 120 is disposed inside the handle section 161, and the internal ring wall of the annular section 162 is disposed with an opening 163, which opens to the handle section 161. The annular section 162 is disposed with the first outlet waterway 130 and a first top cover 170, the first outlet waterway 130 and the first top cover 170 cooperate to form as a second outlet function. In this embodiment, the main body is formed by an upper cover 140 and a lower cover 150 fixed together, but not limited to this, a tri-section main body is available.

In this embodiment, the axis or the central line of the main body is the rotation axis X. the axis of the middle shaft is the rotation axis X, the rotation axis X pass through the opening 163.

The rotation unit is rotatably connected to the fixed unit 100 and rotates about the rotation axis X. in this embodiment, the rotation unit is disposed inside the internal hole of the annular section 162. The rotation unit comprises a water diversion base 200 and a sealing component 300.

In this embodiment, the water diversion base 200 and the fixed unit 100 cooperate to form a cavity 400 available to connect to the inlet waterway 110, in this embodiment, the cavity 400 is connected to the external port of the radial hole of the middle shaft 120.

In this embodiment, the water diversion base 200 comprises a large sleeve column 240 and a small sleeve column 250, the large sleeve column 240 is coaxially fixed to the small sleeve column 250 by a ring wall. In this embodiment, the large sleeve column 240 is rotatably assembled to the middle shaft 120 and form the cavity 400, preferred, a connection base 410 is disposed between the large sleeve column 240 and the body, the connection base 410 is hollow and is disposed with a opening 163 rotatably connected to the annular section 162, the connection base 410 is further disposed with a screw section, the screw section is screwed to the internal revolution surface of the large sleeve column 240, fixing the water diversion base 200 and the connection base 410 one by one, rotatably connecting the water diversion base 200, the connection base and the middle shaft 120 together one by one, so as to form the cavity 400, but not limited to this, as needed, the large sleeve column 240 can directly rotatably connect to the opening 163 and directly connect to the middle shaft 120.

The internal end face of the ring wall is formed as the cooperated surface 210 vertical to the rotation axis X, the cooperated surface 210 is disposed with three diversion water holes 220 annularly arranged about the rotation axis X, the diversion water holes 220 are faced to the cavity 400 and are connected to the cavity 400. the small sleeve column 250 is disposed with two second outlet waterways 230, the small sleeve column 250 is disposed with a second top cover 270, the second outlet waterway 230 and the second top cover to form two outlet functions, a first outlet function and a third outlet function. In this embodiment, two of the three diversion water holes 220 are respectively connected to the two second outlet waterways 230.

In this embodiment, the internal end face of the ring wall is concaved with a pivot hole 180, the first outlet waterway 130 is connected to the pivot hole 180. The water diversion base 200 is disposed with an axial hole 260 along the rotation axis X, the axis hole 260 is connected to the remaining diversion water hole 220. An end of the water diversion base 200 is pivot joint to the pivot hole 180, the axis hole 260 is connected to the first outlet waterway. For convenience to assemble, preferred, a withstand spring 700 is disposed between the pivot hole 180 and the end of the water diversion base. In this embodiment, for example, the outlet port of the remaining diversion water hole 220 is disposed in the external end face of the ring hole opposite to the cooperated surface, thus ensuring that however rotating, the outlet port of the remaining diversion water hole 220 is always connected to the annular groove, the annular groove is connected to the first outlet waterway; in other case, an external annular groove is disposed in the water diversion base, the external annular groove is connected to the remaining diversion water hole 220, the inlet port of the first outlet waterway 130 of the annular section 160 is corresponding to the external annular groove. In this embodiment, the fixed unit is disposed with an outlet waterway, but not limited to this, as needed, the fixed unit can be disposed with several first outlet waterways, the inlet ports of the first outlet waterways are disposed to be annular grooves of concentric or of spaced axially; the outlet ports of part of diversion water holes are radially disposed or spaced radially; the first outlet waterways are connected to the part diversion waterways one by one.

Preferred, a support sleeve 340 is further disposed inside the rotation frame and is fixed with respect to the rotation frame.

The sealing component 300 comprises a rotation frame 310 and a plurality of press blocks 320, the rotation frame 310 and the water diversion base 200 are assembled together and form a synchronous rotation relationship. In this embodiment, the rotation frame 210 is synchronously rotatably disposed inside the large sleeve column 250, the sealing component 300 is disposed inside the cavity 300. the press blocks 320 are slidably connected to the rotation frame 310 and are slidable parallel to the rotation axis X, the plurality press blocks 320 are corresponding to the diversion water holes 220 one by one and the press blocks 320 slide to control the close and open of the inlet port of the diversion water holes 220. In this embodiment, the structure of the rotation frame 210 is not limited, the function thereof is to ensure the sliding direction of the press blocks and to ensure the corresponding of the press blocks and the diversion water holes. Preferred, each press block 320 and the rotation frame 310 is disposed with a restoring elastic piece 330 therebetween, but not limited to this, the elastic pieces can be ignored, and restoring can be implemented by hydraulic power. For convenience to assembly, preferred, the press block is disposed with a positioning groove to position the elastic body.

The fixed unit 100, the rotation frame 310 and the press block 320 cooperate to make that the rotation frame 310, when rotating, drives the press blocks to slide alternately. In this embodiment, the fixed unit 100 is disposed with a middle shaft 120, the middle shaft 120 is protruded with a projection block 121, the middle shaft 120 inserts into the sealing component 300 and the axis thereof coincides with the rotation axis X; the interior of the press block 320 is disposed with a groove 321, the press blocks 320 are arranged about the middle shaft 120, the grooves 321 are cooperated to the projection block 121; when the projection block 320 rotates with respect to the middle shaft 120, the groove 321 corresponding to the press block 121 is pushed by the projection block 121 to drive the press block 320 to slide.

Preferred, in this embodiment, the pushing surface of the projection block 121 has two guiding sections and a parallel section 1212 therebetween. Preferred, the pushed surface of the groove 321 is protruded and smooth, the pushing surface and the pushed surface cooperate to ensure a smooth pushing, the press blocks slide smoothly.

As needed, a positioning mechanism 500 is disposed between the small sleeve column and the internal wall of the annular section, the positioning mechanism comprises a spring connected to the internal wall of the annular section, a pin connected to the spring and a plurality of insert grooves disposed outside the small sleeve column, the pin inserts into the insert groove under the work of the spring, so as to enhance the handle feeling and keep the switch state.

The second embodiment, disclosed is a waterway switch valve set, the main structure thereof refers to the first embodiment, the difference is that the middle shaft 120 of the fixed unit 100 is disposed with a cam, the end face of the cam is concave-convex, the middle shaft 120 inserts to the sealing component 300 and the axis thereof coincides with the rotation axis X; the lower end of the press blocks 320 abut against the end face of the cam; when the press blocks 320 rotate with respect to the cam, the concave-convex end face of the cam works on the press blocks 320 to drive the press blocks 320 to slide.

The third embodiment, disclosed is a waterway switch valve set, the main structure thereof refers to the first embodiment, the difference is that the fixed unit 100 is disposed with a cam with the axis thereof coincided with the rotation axis X, the end face of the cam is concave-convex; the lower end of the press block 320 abuts against the end face of the cam; when the press block 320 rotates with respect to the cam, the concave-convex end face of the cam works on the press block 320 to drive the press block 320 to slide.

The fourth embodiment, disclosed is a waterway switch valve set, the main structure thereof refers to the first embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a waterway switch valve set and a shower head using same, the waterway switch valve set comprises a fixed unit and a rotation unit, the fixed unit, the rotation frame and the press blocks cooperate to make that the rotation frame, when rotating, drives the press blocks to slide alternately. During the switch, the press blocks and the water diversion base never have friction, the switch is labor saving, the service life is long and the switch is convenient.

The invention claimed is:

1. A waterway switch valve set, wherein comprising:
   a fixed unit (100) with an inlet waterway (110); and
   a rotation unit rotatably connected to the fixed unit (100), the rotation unit can rotate about a rotation axis (X), the rotation unit comprising:
   a water diversion base (200) with a cooperated surface (210) vertical to the rotation axis (X), the cooperated surface (210) is disposed with a plurality of diversion water holes (220) annularly arranged about the rotation axis (X), the diversion water holes (220) are available to connect to the inlet waterway (110); and
   a sealing component (300) with a rotation frame (310) and a plurality of press blocks (320), the rotation frame (310) and the water diversion base (200) are assembled together, and form a synchronous rotation relationship, the press blocks (320) are slidably connected to the rotation frame (310) and are available to slide parallel to the rotation axis (X), the press blocks (320) and the diversion water holes (220) are corresponding one by one and the press blocks (320) slide to control the close and open of the diversion water holes (220); the fixed unit (100), the rotation frame (310) and the press blocks (320) cooperate to make that the rotation frame (310), when rotating, drives the press blocks (320) to slide alternately.

2. The waterway switch valve set according to claim 1, wherein the water diversion base (200) and the fixed unit (100) cooperate and form a cavity (400) to connect to the inlet waterway (110), the cooperated surface (210) is opposite to the cavity (400), the diversion water holes (220) are available to connect to the cavity (400); the sealing component (300) is disposed inside the cavity (400).

3. The waterway switch valve set according to claim 1, wherein a restoring elastic piece (330) is disposed between each press block (320) and the rotation frame (310).

4. The waterway switch valve set according to claim 1, wherein:
   the fixed unit (100) is disposed with a middle shaft (120), the middle shaft (120) is protruded with a projection block (121), the middle shaft (120) inserts into the sealing component (300) and the middle shaft thereof coincides with the rotation axis (X);
   the interior of the press block (320) is disposed with a groove (321), the press blocks (320) are arranged about the middle shaft (120), the groove (321) and the press block (121) cooperate;
   when the press blocks (320) rotate with respect to the middle shaft (120), the groove (321) corresponding to projection block (121) is pushed by the projection block (121) to drive the press blocks (320) to slide.

5. The waterway switch valve set according to claim 1, wherein:
   the fixed unit (100) is disposed with a middle shaft (120), the middle shaft (120) is disposed with a cam, the end face of the cam is concave-convex, the middle shaft (120) inserts into the sealing component (300) and the axis thereof coincides with the rotation shaft (X);
   the lower ends of the press blocks (320) abut against the end face of the cam;
   when the press blocks (320) rotate with respect to the cam, the concave-convex end face of the cam works on the press blocks (320) to drive the press blocks (320) to slide.

6. The waterway switch valve set according to claim 4, wherein the middle shaft (120) is disposed with a hollow hole, the hollow hole forms the part or whole of the inlet waterway (110).

7. The waterway switch valve set according to claim 1, wherein:
   the fixed unit (100) is disposed with a cam with the axis thereof coinciding with the rotation shaft (X), the end face of the cam is concave-convex;
   the lower ends of the press blocks (320) abut against the end face of the cam;
   when the press blocks rotate with respect to the cam, the concave-convex end face of the cam works on the press blocks (320) to drive the press blocks (320) to slide.

8. The waterway switch valve set according to claim 1, wherein the fixed unit (100) is disposed with a pivot hole (180) and a first outlet waterway (130), the first outlet waterway is connected to the pivot hole; the water diversion base (200) is disposed with an axis hole (260) along the rotation shaft (X), the axis hole (260) is connected to a diversion water hole (220), the end of the water diversion base (200) is pivot joint to the pivot hole (180), the axis hole (260) is connected to the first outlet waterway.

9. A waterway switch valve set, wherein comprising:
   a fixed unit with an inlet waterway, a plurality of outlet waterways and a cavity connected to the inlet waterway and the outlet waterways therebetween, the inlet ports of the outlet waterways are annularly arranged about an axis;
   a plurality of press blocks slidably connected to the fixed unit inside the cavity, the press blocks are available to slide parallel to the axis, the press blocks and the outlet waterways are corresponding one by one, the press blocks slide to control the open and close of the outlet waterways; and
   a rotation unit rotatably connected to the cavity of the fixed unit, the rotation unit rotates about the axis, the fixed unit, the press blocks and the rotation unit cooperate to make that the rotation unit, when rotating, drives the press blocks to slide alternately.

10. The waterway switch valve set according to claim 2, wherein a restoring elastic piece (330) is disposed between each press block (320) and the rotation frame (310).

11. The waterway switch valve set according to claim 5, wherein the middle shaft (120) is disposed with a hollow hole, the hollow hole forms the part or whole of the inlet waterway (110).

* * * * *